April 9, 1935.  A. M. KREMENTZ  1,996,926
OPTICAL DEVICE
Filed May 31, 1933
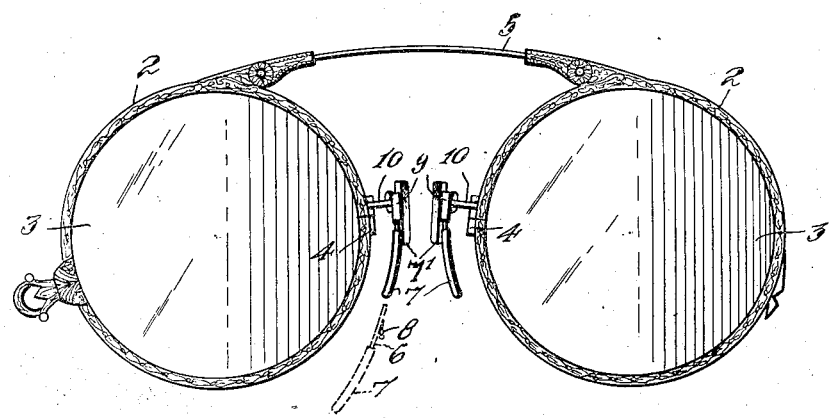
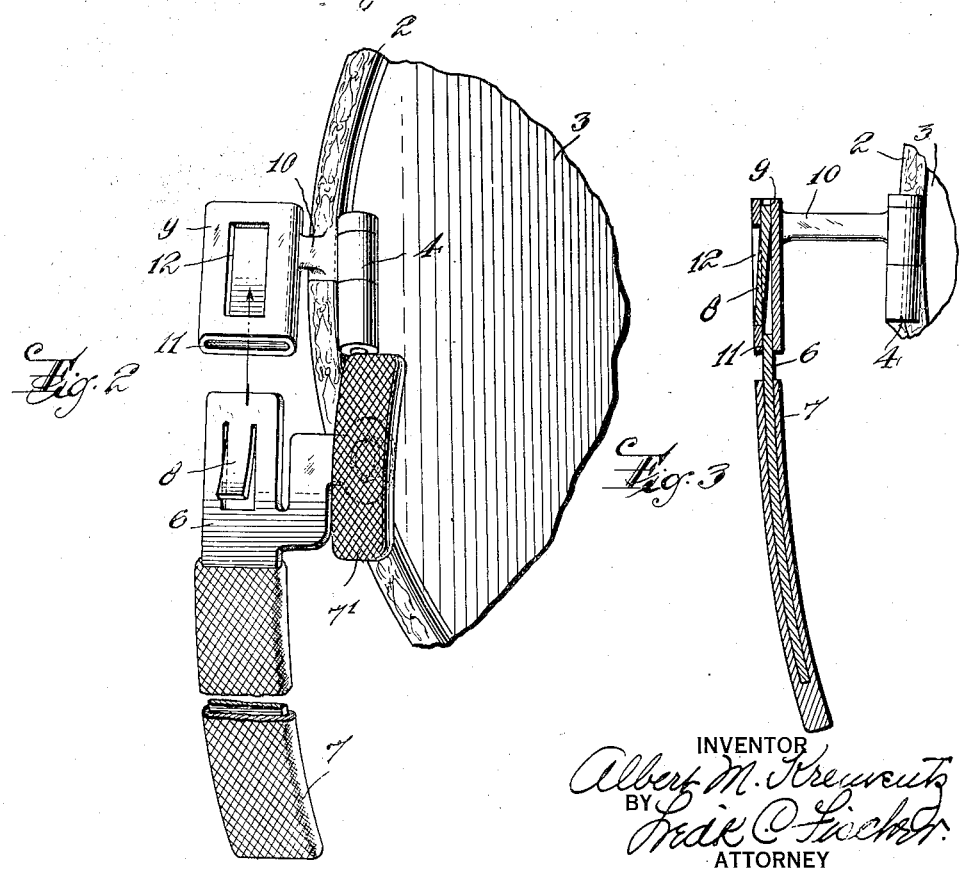
INVENTOR
Albert M. Krementz
BY
Fredk C. Fischer Jr.
ATTORNEY Patented Apr. 9, 1935

1,996,926

UNITED STATES PATENT OFFICE 1,996,926

OPTICAL DEVICE

Albert M. Krementz, Maplewood Township, Essex County, N. J., assignor to Frank Krementz Company, Newark, N. J., a corporation of New Jersey Application May 31, 1933, Serial No. 673,666

2 Claims. (Cl. 88—42)

This invention relates to optical devices, such as eyeglasses, goggles and the like, provided with nose guards to engage opposite sides of the nose.

The invention relates, more particularly, to a novel means for securing the nose guards to the frames of such devices without the use of screws, soldering, or other extraneous means.

The object of my invention is to provide, in an optical device having a frame, a nose guard plate having an integral spring prong adapted to automatically snap into engagement with an opening in the front wall of a suitable casing secured to the frame, to removably secure the parts together.

A further object of my invention is to provide a noseguard plate and a casing for receiving the same, of novel, simple and durable construction, and neat and attractive appearance, adapted to be economically manufactured in large quantities by the use of simple tools and dies, from suitable sheet metal.

These and other objects, which will later appear, are accomplished by the simple and practical construction and arrangement of parts hereinafter described and illustrated in the accompanying drawing, in which:

Fig. 1 represents a front view of a pair of eyeglasses, embodying my invention, showing, in dotted lines, the position of the noseguard before its insertion into the casing, Fig. 2 represents an enlarged perspective view of the noseguard plate, and the casing for receiving the same, the latter being shown attached to an eyeglass frame, shown fragmentarily; and Fig. 3 represents a vertical transverse cross-sectional view of the noseguard plate, positioned in the casing, showing the manner in which the spring prong of the noseguard plate snaps into the front wall of the casing to removably secure the parts together.

It will be understood that my invention may be applied to any form of optical device, and to any form of eyeglasses, but, for the purpose of illustration, I have shown the same as used in connection with an "Oxford" or "folding" type of eyeglasses.

My invention is primarily designed to provide a novel means for securing the noseguards to the lens frames, and, as the same arrangement is preferably used for securing both noseguards to the frames, a description of one will suffice for both.

The optical device shown in the drawing, comprises a pair of lens frames 2, in which a pair of lenses 3 are secured in any desired or convenient manner, such as by constructing the frames 2 in the form of split rings held together by rivet members 4 or the like, the frames 2 being connected by any customary means such as by a bridge spring 5 or the like.

In the preferred form of my invention the metallic noseguard plate 6 has secured thereto in any desired or convenient manner the nose pieces 7 and 7', preferably made of pearl or similar material, the latter being preferably tiltably secured to the noseguard 6 in any desired or convenient manner, to accommodate itself to the contour of the nose.

The noseguard plate 6 is further provided with an integral spring tongue 8, for a purpose to be presently explained. A suitable flat casing 9 is secured to the lens frame 2 by a post 10 or the like, the casing being provided with a longitudinal opening 11 and with an opening 12 in its front wall so that, as shown in Fig. 2, the guard plate 6 may be inserted into the casing through the lower end thereof and the spring tongue 8 will automatically snap into the opening 12 of the casing to removably secure the parts together, as clearly shown in Fig. 3.

It will thus be seen that I have provided co-operating means formed integral with the noseguard plate and an apertured casing for removably securing the same together and I have obviated the necessity of providing extraneous means for this purpose.

The apertured casing 9 and the noseguard plate 6 are so constructed that the noseguard plate may be readily inserted into the casing 9, and, when this is done, the tongue 8 of the plate 6 will be in alignment with the opening 12 of the casing 9 and will automatically snap into engagement therewith to removably secure the parts together.

The noseguard plate is thus effectively held in the casing and may be removed therefrom for repairs or replacement, by inserting a suitable tool through the casing opening 12 to depress the tongue 8 clear of said opening.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. In an optical device having a pair of lens carrying frames, a casing secured to one of said frames, said casing being provided with a longitudinal opening and with an opening in its front wall, and a noseguard plate provided with a depressible spring tongue integral therewith and normally projecting beyond the plane of the plate, said plate being adapted to be inserted into the casing through the longitudinal opening, so that the spring tongue thereof will first be depressed into the plane of the plate and then will automatically snap into engagement with the opening in the front wall of the casing beyond the plane of the plate, to secure the parts together.

2. In an optical device having a pair of lens carrying frames, a casing having a longitudinal opening and an opening in its front wall, a noseguard plate provided with nose pieces and with a depressible spring tongue integral therewith and struck up therefrom, said noseguard plate being adapted to be inserted into the casing through the longitudinal opening, so that the spring tongue thereof will first be depressed into the plane of the plate and then will automatically snap into engagement with the opening in the front wall of the casing beyond the plane of the plate, to removably secure the parts together.

ALBERT M. KREMENTZ.